United States Patent
Zhang et al.

(10) Patent No.: US 12,093,864 B2
(45) Date of Patent: Sep. 17, 2024

(54) INVENTORY ITEM PREDICTION AND LISTING RECOMMENDATION

(71) Applicant: eBay Inc., San Jose, CA (US)

(72) Inventors: Zezhong Zhang, Campbell, CA (US); Huiying Mao, Durham, NC (US); Sumin Shen, Campbell, CA (US); Pak Hei Ieong, San Jose, CA (US); Atindra Mardikar, San Jose, CA (US)

(73) Assignee: eBay Inc., San Jose, CA (US)

( * ) Notice: Subject to any disclaimer, the term of this patent is extended or adjusted under 35 U.S.C. 154(b) by 131 days.

(21) Appl. No.: 17/323,717

(22) Filed: May 18, 2021

(65) Prior Publication Data
US 2022/0374805 A1 Nov. 24, 2022

(51) Int. Cl.
*G06Q 10/0631* (2023.01)
*G06N 5/04* (2023.01)
*G06N 20/00* (2019.01)

(52) U.S. Cl.
CPC ......... *G06Q 10/06315* (2013.01); *G06N 5/04* (2013.01); *G06N 20/00* (2019.01)

(58) Field of Classification Search
CPC ......... G06Q 10/06315; G06Q 30/0631; G06Q 10/0875; G06Q 10/04; G06Q 10/06375; G06Q 30/0633; G06N 20/00; G06N 5/04
See application file for complete search history.

(56) References Cited

U.S. PATENT DOCUMENTS

| | | | | |
|---|---|---|---|---|
| 7,962,374 B2* | 6/2011 | Altschuler | ............ | G06Q 30/06 |
| | | | | 705/26.1 |
| 11,100,524 B1* | 8/2021 | Ross | ...................... | G06N 7/00 |
| 11,157,987 B2* | 10/2021 | Kumar | ..................... | G06N 5/01 |
| 11,361,349 B1* | 6/2022 | Smith | ................ | G06Q 30/0201 |
| 11,763,360 B1* | 9/2023 | O'Connor | ......... | G06Q 30/0601 |
| | | | | 705/26.1 |

(Continued)

OTHER PUBLICATIONS 22157903.0 , "Extended European Search Report", European Patent Application No. 22157903.0, Aug. 16, 2022, 9 pages.

(Continued)

*Primary Examiner* — Dylan C White
(74) *Attorney, Agent, or Firm* — FIG. 1 Patents

(57) ABSTRACT

An inventory prediction system is described that outputs a predicted inventory item not included in a user's known inventory using a cross-category directional graph that represents item categories as nodes. The inventory prediction system implements a prediction model trained using machine learning to output the predicted inventory item using the graph and at least one item from the user's known inventory. The inventory prediction system is further configured to generate a listing recommendation for the predicted inventory item. To do so, the inventory prediction system implements a logistic regression model trained using machine learning to calculate a probability that the listing recommendation should be generated using attributes of the predicted inventory item and attributes of currently trending items. The listing recommendation is generated to include a description of, and estimated value for, the predicted inventory item, together with an option to generate a sale listing for the predicted inventory item.

20 Claims, 8 Drawing Sheets

(56) References Cited

U.S. PATENT DOCUMENTS

| | | | | |
|---|---|---|---|---|
| 2005/0160014 A1* | 7/2005 | Moss | ............... | G06Q 30/0259 |
| | | | | 705/26.61 |
| 2005/0177443 A1* | 8/2005 | Rodriguez | ............ | G06Q 30/08 |
| | | | | 705/26.3 |
| 2012/0036037 A1* | 2/2012 | Xiao | ................. | G06Q 30/0631 |
| | | | | 705/26.7 |
| 2014/0258016 A1* | 9/2014 | Hale | ..................... | G06Q 30/08 |
| | | | | 705/26.7 |
| 2017/0061286 A1* | 3/2017 | Kumar | ............. | G06Q 30/0269 |
| 2017/0236182 A1* | 8/2017 | Ignatyev | ............ | G06Q 30/0631 |
| | | | | 705/26.7 |
| 2019/0392330 A1* | 12/2019 | Martineau | ............. | G06N 20/00 |
| 2021/0110306 A1* | 4/2021 | Krishnan | ................ | G06N 5/04 |
| 2021/0374577 A1* | 12/2021 | Lin | .................... | H04L 67/1097 |
| 2022/0101460 A1* | 3/2022 | Dong | .................... | G06N 3/088 |
| 2022/0229923 A1* | 7/2022 | Pevzner | ................. | G06F 21/64 |
| 2022/0398445 A1* | 12/2022 | Polleri | ............... | G06F 16/3335 |
| 2023/0385887 A1* | 11/2023 | Fuchs | .................. | G06F 40/174 |

OTHER PUBLICATIONS

Cremonesi, Paolo, et al., "Cross-Domain Recommender Systems", 2011 IEEE 11th International Conference on Data Mining Workshops [retrieved Sep. 6, 2022]. Retrieved from the Internet <https://doi.org/10.1109/ICDMW.2011.57>, Dec. 2011, 8 pages.
KR10-2022-0017950, "Foreign Office Action", KR Application 10-2022-0017950, May 13, 2024, 6 pages.

* cited by examiner

INVENTORY ITEM PREDICTION AND LISTING RECOMMENDATION

BACKGROUND

Conventional inventory management systems are used to predict future needs. For instance, retail entities implement inventory systems to estimate when retail locations will sell out of a particular item in order to preemptively restock. To do so, conventional inventory systems forecast demand for various items based on historical transaction information, such as a quantity of items previously purchased by a retail location relative to a quantity of items sold by the retail location, and extrapolate to predict a future need for the entity. Conventional inventory systems thus rely heavily on information that comprehensively describes an entity's current inventory and regard this current inventory information as a ground truth in predicting future inventory needs. Consequently, conventional inventory systems are unable to identify missing items that should otherwise be included in an entity's current inventory list.

SUMMARY

An inventory prediction system is described that outputs, for a specified user, a predicted inventory item that is not included in data describing a known inventory for the specified user. To do so, the inventory prediction system leverages a cross-category directional graph comprised of a node-edge structure, where nodes of the graph represent item categories that each include multiple items. The inventory prediction system is configured to generate the cross-category directional graph based on user data describing one or more items known to be owned each user of a plurality of users. Items specified in the known inventories of the user data are assigned to category nodes of the cross-category directional graph based on associated item attributes, such that each category node includes multiple items having at least one common attribute. Each category node is further assigned a value that represents values of the multiple items included in the category node.

The inventory prediction system then identifies connections between various pairs of category nodes, where a connection indicates that known inventories of at least two users in the user data indicate ownership of one or more items included in each of the category nodes linked by the connection. Node connections are then weighted based on a number of users known to own items in both node categories linked by the connection. The weighted node connections are then filtered based on an edge threshold value, such that node connections having weights that fail to satisfy the edge threshold are not represented in the cross-category directional graph. For connections having weights that satisfy the edge threshold, the inventory prediction system generates an edge connecting the node categories, and assigns a direction to the edge based on the respective values of node categories linked via the edge. For instance, the cross-category directional graph is generated such that edges are directed to flow from lower-value to higher-value category nodes.

Given the cross-category directional graph, the inventory prediction system implements a prediction model trained using machine learning to output a predicted inventory item owned by a specified user, given as input information describing an item known to be owned by the specified user. To do so, the prediction model is trained to identify a category node in the cross-category directional graph that includes the known inventory item and traverse the graph to identify a different category node based on the weighted edges. Similarities are then computed between the known inventory item and items in the different category node using natural language processing to identify the predicted inventory item, which is then output by the inventory prediction system together with an estimated value of the predicted inventory item.

The inventory prediction system is further configured to selectively generate a listing recommendation for the predicted inventory item, responsive to determining that the predicted inventory item corresponds to a trending item list that describes items that are currently in-demand or otherwise valued favorably relative to ordinary values for the item. In determining whether to generate a listing recommendation for a predicted inventory item, the inventory prediction system implements a logistic regression model trained using machine learning to calculate a probability that the listing recommendation should be generated by analyzing attributes of the predicted inventory item and attributes of trending items included in the trending item list. Responsive to determining that the probability satisfies a threshold value, the inventory prediction system outputs the listing recommendation, which includes a description of the predicted inventory item, an estimated value for the predicted inventory item, and a selectable option to initiate generating a listing for sale of the predicted inventory item via one or more retail entities.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

DETAILED DESCRIPTION

Overview

Figure 1:
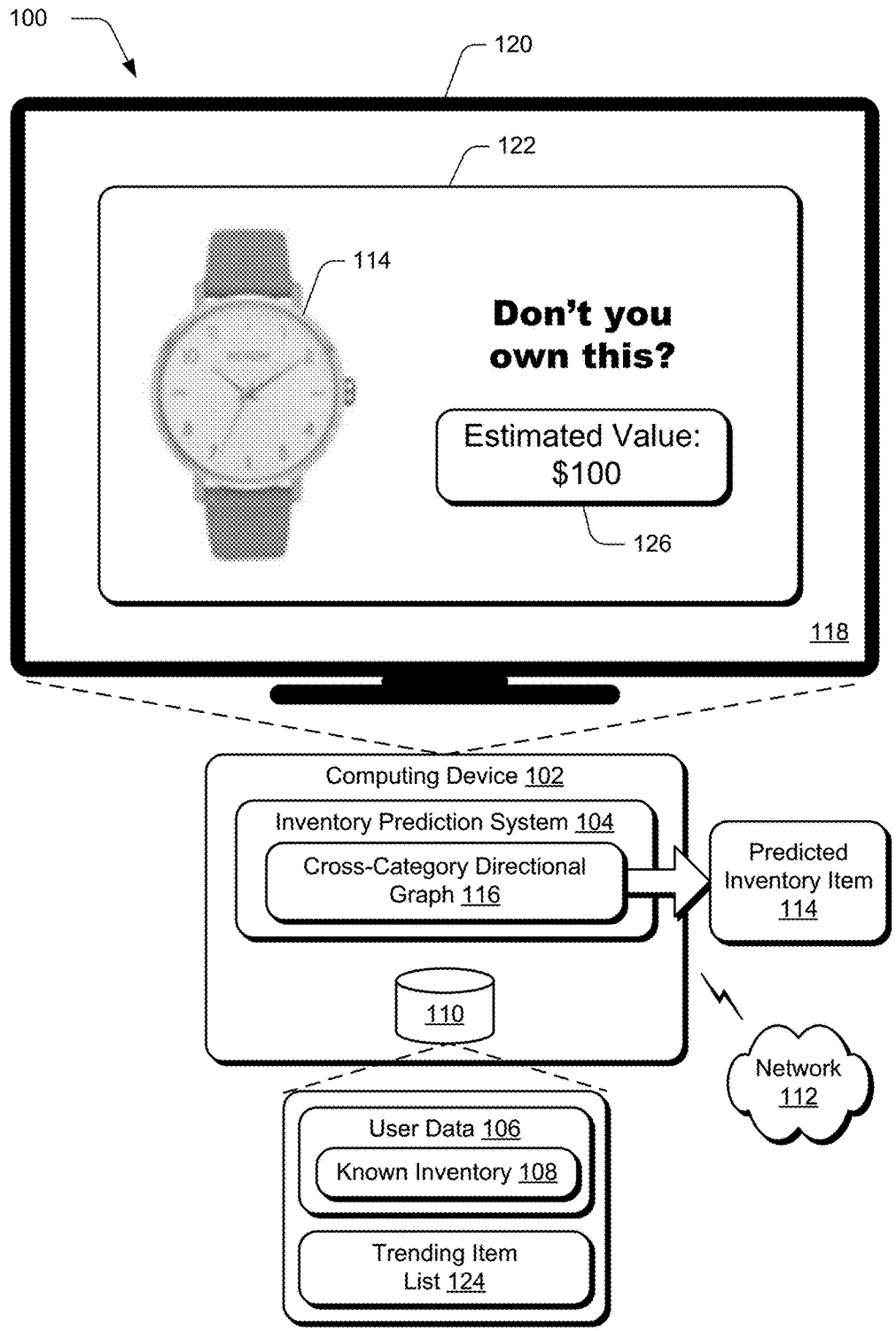
FIG. 1 is an illustration of an environment in an example implementation that is operable to employ an inventory prediction system to predict an inventory item owned by a user and generate a listing recommendation for the predicted inventory item in accordance with techniques described herein.

Businesses and retail entities often keep inventory lists to track items the business currently has in stock. This information is used to predict future inventory needs more accurately, such as when a business will need to order more of a particular item before running out of stock. Businesses diligently track this information because conventional inventory management systems and inventory forecasting approaches regard these inventory lists as ground truths for predicting future needs. Because the inventory lists are regarded as factual and complete as to all items currently stocked by a business, conventional inventory management systems are not designed to identify missing items that should otherwise be included in an inventory list.

In contrast to businesses and retail entities that track inventory as part of their standard operations, the average individual does not maintain a record describing a current inventory of items they own. While some retail entities automatically track this information on behalf of their customers in the form of an order history saved to a user account, such user account information provides only a limited snapshot regarding an entire inventory of items owned by an individual. While information describing an individual's purchase histories can be aggregated from multiple sources (e.g., order/purchase histories from different retail entities), such aggregated information fails to account for items acquired from other sources (e.g., via a different retail entity, as a gift, and so forth). Consequently, inventory lists for non-commercial entities (e.g., individuals) are often incomplete as to all items owned by the entity. In some scenarios, individuals are tasked with completing an inventory list when it is impossible to manually do so. For instance, homeowners tasked with providing an inventory list to an insurance company that describes possessions decimated due to a fire, natural disaster, and the like, are unable to walk around their home and manually take inventory of items they own, much less estimate a value for items that cannot be identified as being owned.

To address these issues, techniques for predicting inventory items owned by an individual are described. In one example, an inventory prediction system generates a cross-category directional graph that is useable to facilitate inventory item prediction based on user data describing known inventories of different users. Items listed in the known inventories having similar attributes are grouped as a category and represented as a node in the cross-category directional graph. By grouping items and representing multiple items as a single node in the cross-category directional graph, the inventory prediction system is configured to accurately identify items not included in an individual's known inventory using fewer computational and network resources than would be required if known inventory items were individually represented as nodes in the graph, as described in further detail below.

Various pairs of the item category nodes are linked in the cross-category directional graph if different users in the user data have known inventories with items included in both category nodes of the pair. The node links are assigned a weight based on a number of different users owning items in both categories represented by the node pair. To control a sparsity of the cross-category directional graph, and consequently the computational resources required to output a prediction using the graph, weighted node connections are then filtered based on an edge threshold value, such that node connections having weights that fail to satisfy the edge threshold are not represented in the cross-category directional graph. Edges in the graph are finally assigned a direction, based on item values included in the category nodes linked by the edge, which guides a manner in which an inventory item prediction is made using the graph.

The inventory prediction system is further configured to train a prediction model with machine learning to predict an inventory item owned by a particular individual, based on information describing one or more items known to be owned by the individual. Once provided with information identifying the one or more items known to be owned by the individual, the prediction model is configured to automatically (i.e., independent of user input) output the predicted inventory item using information encoded in the node categories and weighted edges of the cross-category directional graph.

The inventory prediction system is configured to output the predicted inventory item for display via a user interface together with a description of, and estimated current value for, the predicted inventory item. In some implementations, the inventory prediction system is further configured to generate a listing recommendation for the predicted inventory item. In determining whether to generate a listing recommendation for a predicted inventory item, the inventory prediction system implements a logistic regression model trained using machine learning to automatically calculate a probability that the listing recommendation should be generated by analyzing attributes of the predicted inventory item and attributes of trending items included in a trending item list. A listing recommendation generated by the inventory prediction system includes the description and estimated value of the predicted inventory item as well as an option to list the predicted inventory item for sale via a retail entity. Further discussion of these and other examples is included in the following sections and shown in corresponding figures.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 includes an inventory prediction system 104. The inventory prediction system 104 is implemented a least partially in hardware of the computing device 102 to process user data 106, which is representative of information describing a known inventory 108 that specifies at least one item owned by a user represented in the user data 106. The user data 106 is illustrated as maintained in a storage device 110 of the computing device 102, and in some implementations is representative of data obtained from one or more sources implemented remotely from the computing device 102, such as from one or more remote sources via the network 112. In this manner, the user data 106 represents a range of information types that indicate item ownership.

For instance, in an example implementation the user data 106 comprises at least one of explicit user input at the computing device 102 (e.g., a spreadsheet with entries tracking gifts received by a user), user profile data obtained from at least one e-commerce platform (e.g., describing a purchase history of the user via the e-commerce platform), e-mail data obtained from a messaging service (e.g., messages indicating order confirmations for the user from one or more vendors), social data (e.g., text and/or image data obtained from a social media platform depicting and/or describing items in association with the user), combinations thereof, and so forth. Thus, the known inventory 108 for a specified user is representative of information gleaned from one or more sources describing items that have been acquired by, or are otherwise owned, possessed, retained, or controlled by the specified user.

The user data 106 is processed by the inventory prediction system 104 using a prediction model trained with machine learning to output a predicted inventory item 114, which is representative of an item not included in the known inventory 108 of the user data 106 for a specified user. The trained prediction model is configured to output the predicted inventory item 114 by processing the known inventory 108 of the specified user and a cross-category directional graph 116 as inputs.

The cross-category directional graph 116 is representative of information describing item ownership by a plurality of different users, where nodes of the graph represent categories of multiple different items. Edges linking various pairs of the nodes are established based on a number of users owning items in linked nodes, as well as values assigned to the two nodes linked by an edge. In some implementations, the inventory prediction system 104 is configured to generate the cross-category directional graph 116 using the user data 106, as described in further detail below. Alternatively, the inventory prediction system 104 is configured to obtain the cross-category directional graph 116 from the storage device 110 of the computing device 102 or from a source other than the computing device 102, such as via the network 112.

The inventory prediction system 104 is configured to output a description of the predicted inventory item 114 in a user interface 118 via a display device 120 of the computing device 102. In implementations, the description of the predicted inventory item 114 is displayed in the user interface 118 as an image of the predicted inventory item 114, a textual description of the predicted inventory item 114 (e.g., an item title, a product description, a product category for the item, a manufacturer of the item, a brand of the item, condition of the item, etc.), combinations thereof, and so forth.

The inventory prediction system 104 is further configured to output a display of a listing recommendation 122 for the predicted inventory item 114 in the user interface 118. In some implementations, the listing recommendation 122 is selectively generated by the inventory prediction system 104 responsive to determining that the predicted inventory item 114 corresponds to a trending item list 124 or other information indicating market demand for the predicted inventory item 114. To do so, the inventory prediction system 104 is configured to compile information describing popular items from one or more retail entities (e.g., e-commerce platforms, online marketplaces, and so forth), and generate a ranked list indicating a current market demand for the popular items.

In implementations, the inventory prediction system 104 is configured to generate a trending item list 124 for a discrete geographic region, such as a geographic region in which the computing device 102 is disposed. Alternatively, the trending item list 124 is representative of global information describing the current market demand for items listed in the trending item list 124. The trending item list 124 is periodically updated (e.g., every second, every hour, every day, etc.) and thus represents real-time monitoring of market demand for items as indicated by purchases from retail entities. Given the real-time monitoring provided by the trending item list 124, the inventory prediction system 104 identifies an estimated current value for the predicted inventory item 114 and includes the estimated value 126 in the listing recommendation 122.

The inventory prediction system 104 is thus configured to predict items owned by a user that are not identified in information describing the user's known inventory, inform the user as to estimated values of these items, and recommend consideration of listing the items responsive to identifying a correlation between a predicted inventory item and a trending item list.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Figure 2:
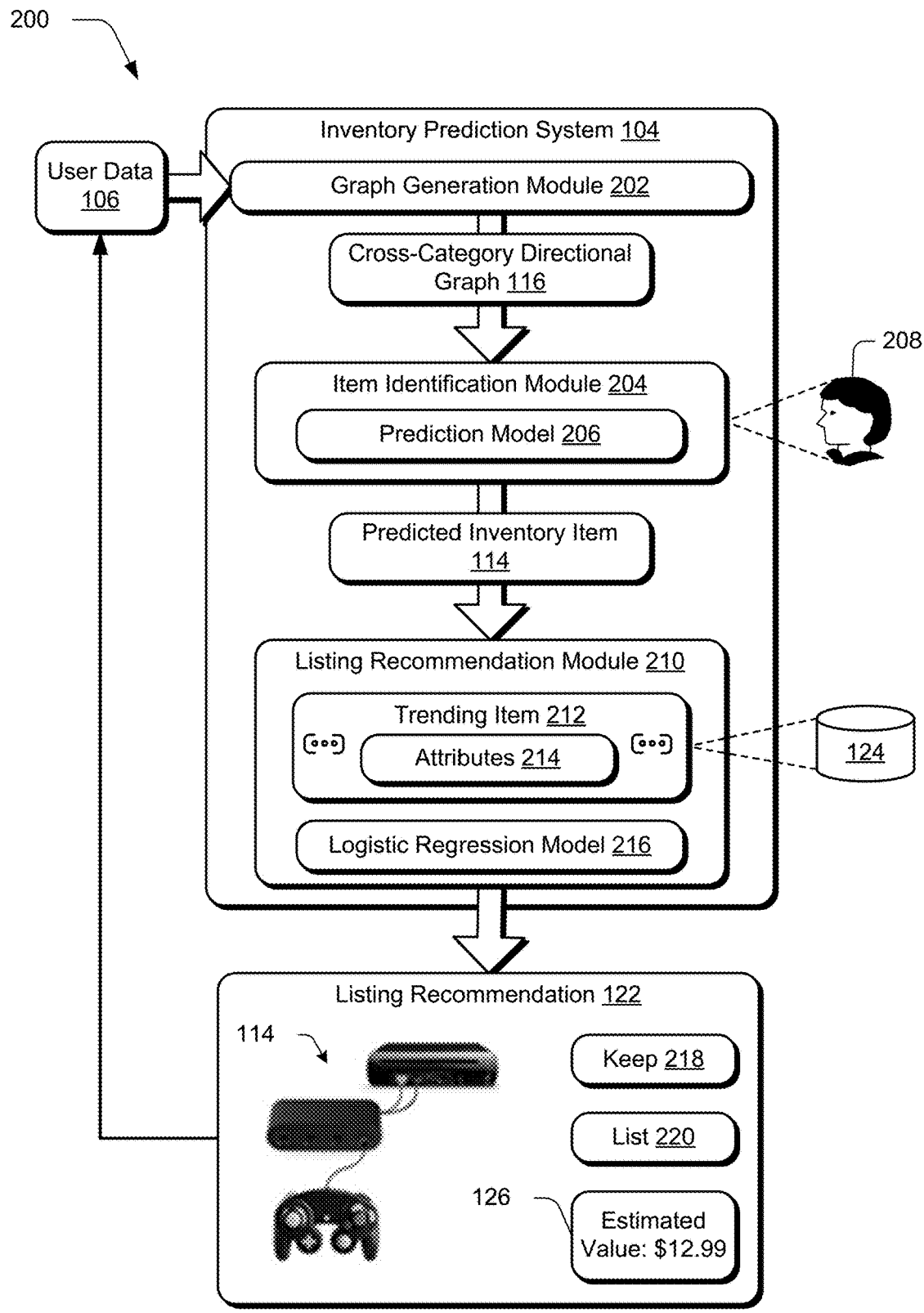
FIG. 2 depicts a system in an example implementation showing operation of the inventory prediction system of FIG. 1 in greater detail.

Inventory Item Prediction and Listing
Recommendation Using a Cross-Category
Directional Graph FIG. 2 depicts a system 200 in an example implementation showing operation of the inventory prediction system 104 of FIG. 1 in greater detail. To begin in this example, a graph generation module 202 is employed by the inventory prediction system 104, which is configured to generate the cross-category directional graph 116 using the user data 106. For a detailed description of generating the cross-category directional graph 116, consider FIG. 3.

Figure 3:
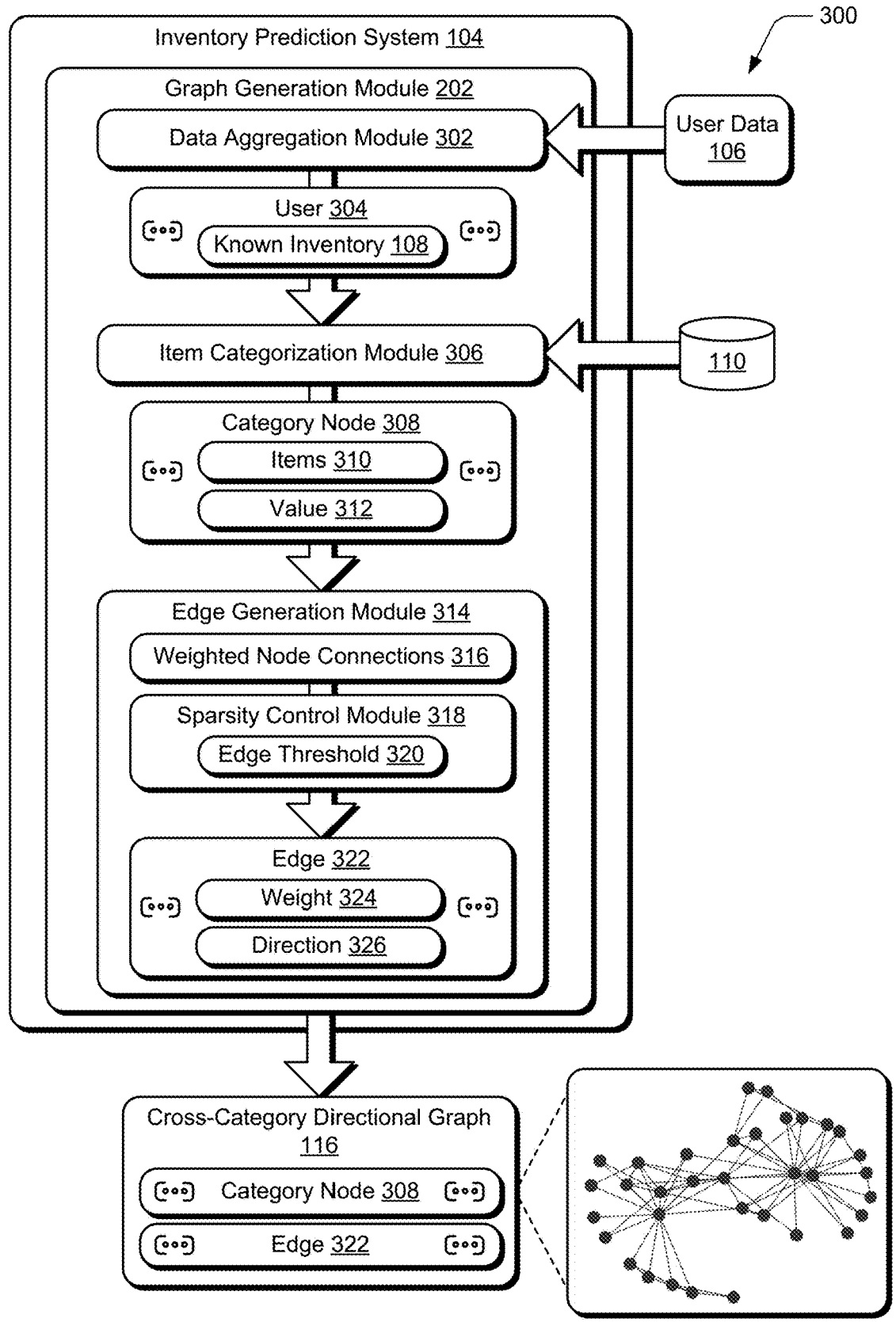
FIG. 3 depicts an example implementation showing operation of a graph generation module implemented by the inventory prediction system of FIG. 1 in greater detail.

FIG. 3 depicts a system 300 in an example implementation showing operation of the graph generation module 202 employed by the inventory prediction system 104 in greater detail. To begin in this example, the user data 106 is provided to a data aggregation module 302. The data aggregation module 302 processes the user data 106 into a structured data format that associates each individual user 304 identified in the user data 106 with a corresponding known inventory, where the known inventory 108 for a user 304 identifies one or more items known to be owned by the user.

The structured data format describing a known inventory 108 for each user 304 included in the user data 106 is then provided to an item categorization module 306. The item categorization module 306 is configured to generate a plurality of item categories, where each item category is represented as a category node 308 to be included in the cross-category directional graph 116. Each category node 308 includes a plurality of items 310, where items are assigned to a particular category node 308 based on a product description that identifies at least one attribute for the item (e.g., a title of the item, a brand of the item, a condition of the item, a type of the item, a seller of the item, an average sale price of the item, etc.) combinations thereof, and so forth.

In some implementations, the item categorization module 306 assigns items 310 from the user data 106 (e.g., as represented by a known inventory 108 for each user 304 described in the user data 106) to one of a plurality of predefined item categories. For instance, the predefined item categories are specified by a developer of the inventory prediction system 104, obtained from storage device 110 of the computing device 102 implementing the inventory prediction system 104, obtained from a location remote from the computing device 102 via network 112 (e.g., as a list of categories used to organize items for navigation via one or more online marketplaces), combinations thereof, and so forth.

Alternatively or additionally, the item categorization module 306 is configured to generate a category nodes 308 independent of information specifying predefined item categories. For instance, the item categorization module 306 is configured to process attribute information for each item specified in the user data 106 and generate groups of items 310 having a threshold number of common attributes. The threshold number of common attributes used to assign items 310 to a category node 308 is configurable as any suitable integer and may be pre-specified by a developer of the inventory prediction system 104, specified via manual user input to the computing device 102 implementing the inventory prediction system 104, or combinations thereof. Although only a single category node 308 is illustrated in the example system 300, the item categorization module 306 is configured to generate any suitable number of category nodes from the user data 106 (e.g., hundreds, thousands, millions, and so forth).

The item categorization module 306 is further configured to assign a value 312 to each 308. In some implementations, the value 312 for a category node 308 is determined based on information describing average sale prices for each of the items 310 included in the category nodes 308. Alternatively or additionally, the value 312 for a category node 308 is determined based on information describing listing prices, advertised prices, discounts, and the like for the items 310 included in the category nodes 308. In this manner, the value 312 is representative of a market value for items 310 included in the category nodes 308, such that a category node 308 having a high value 312 is representative of items 310 having generally higher prices than items 310 included in a category nodes 308 corresponding to a lower value 312. The item categorization module 306 is configured to periodically update the value 312 for each category nodes 308, such that the graph generation module 202 is provided with real-time information regarding a current market valuation for items represented by category nodes 308.

Each category nodes 308 is then provided to an edge generation module 314. The edge generation module 314 is configured to compute weighted node connections 316, where each of the weighted node connections 316 connects two of the category nodes 308. A weighted node connection 316 is established responsive to the edge generation module 314 detecting that the known inventories of at least two different users include items in both of the category nodes 308 that are linked by the weighted node connection. The edge generation module 314 assigns a weight to each of the weighted node connections 316 based on a number of the users whose known inventories indicate ownership of items in both of the category nodes 308 linked by the weighted node connection.

In some implementations, the weighted node connections 316 are generated by the edge generation module 314 in a table format structure. For instance, in a table format, a first column identifies an identifier of a first one of the category nodes 308 linked by a node connection, a second column identifies an identifier of a second one of the category nodes 308 linked by the node connection, and a third column identifier a weight for the node connection (e.g., an integer value identifying a number of different users in the user data 106 owning items in both the linked category nodes 308). Such a table format is merely representative of a type of structured data, and the edge generation module 314 is configured to output the weighted node connections 316 in a variety of data structure types.

The weighted node connections 316 are then provided to a sparsity control module 318, which is configured to filter the weighted node connections 316 according to an edge threshold 320. The edge threshold 320 is representative of a measure that controls the sparsity of the cross-category directional graph 116, such that an edge 322 is established in the cross-category directional graph 116 from one of the weighted node connections 316 if the node connection has a weight that satisfies the edge threshold 320. In this manner, a lower edge threshold 320 results in a cross-category directional graph 116 having increased edge density relative to a higher edge threshold 320. While increased edge density improves an accuracy of predictions generated using the cross-category directional graph 116, it similarly increases an amount of computational resources required to perform the prediction.

Accounting for this trade-off in predictive accuracy and computational cost, the sparsity control module 318 is configured to compute a value for the edge threshold 320 that minimizes computational resource requirements while maximizing predictive accuracy. To do so, the sparsity control module 318 generates an evaluation dataset from the user data 106, where the evaluation dataset includes U users and J category nodes, with U designating an integer subset of the users 304 and J designating an integer subset of the category nodes 308. U and J are thus each representative of any suitable integer, constrained only by a number of users identified by the data aggregation module 302 and a number of category nodes 308 output by the item categorization module 306, respectively.

In this manner, an U×J matrix $M^{(true)}$ represents the true ownership relationship between users 304 and items included in category nodes 308, such that $M_{ju}^{(true)}=1$ if a user u owns an item in category node j, and =0 otherwise. The evaluation dataset implemented by the sparsity control module 318 masks (i.e., hides) some ground truth of user-item ownership data, denoted as S. Given this masking, the evaluation dataset with hidden ownership data otherwise represented in a known inventory 108 is expressed as the matrix M, such that $M_{uj}$ is NULL if (u, j)⊆S and $M_{uj}=M_{uj}^{(true)}$ if (u, j)⊈S.

The sparsity control module 318 then attempts to predict the known inventory 108 values that are masked in the evaluation dataset. To do so, for each masked known inventory 108 value, the sparsity control module 318 considers unmasked values in the known inventory 108 for a user 304 and identifies a category node 308 including items 310 that correspond to an unmasked item listed in the user's known inventory 108. The sparsity control module 318 then determines the value 312 for the identified category nodes 308 and uses the weighted node connections 316 to identify a different category node 308 that has a higher value than the identified category node 308 and is linked to the identified category node 308 via one of the weighted node connections 316.

The sparsity control module 318 then predicts which one of the items 310 included in the different category node 308 is represented by the masked value in the evaluation dataset. To do so, the sparsity control module 318 compares a title of the item in the user's known inventory 108 that was used to identify the different category node 308 with titles of the items 310 included in the different category node 308. Using natural language processing, an item in the different category node 308 having the highest degree of similarity is output as the predicted value masked in the evaluation dataset. The sparsity control module 318 is configured to implement any suitable natural language processing method to determine the similarity between the title of the item in the user's known inventory 108 that was used to identify the different category node 308 and titles of the items 310 included in the different category node 308, such as cosine similarity, Euclidean distance, Jaccard similarity, Term Frequency, and so forth.

For instance, in an example implementation where cosine similarity is used, the sparsity control module 318 generates a vector representation for each item using words that describe the item (e.g., an item title, item description, and so forth). The sparsity control module 318 then computes the cosine of the angle between the two vectors, as projected in a multi-dimensional space. A cosine value closer to one indicates that the items are similar, while a cosine value closer to zero indicates that the items are not similar.

In another example implementation where Term Frequency is used, the sparsity control module 318 performs at least one of stemming or lemmatization of words that describe items (e.g., an item title, item description, and so forth) and process the words into word tokens. In contrast to the original words from which these word tokens are generated, each word token represents common variations of a root word that accounts for the word's use in a corresponding language's full vocabulary, for better use in item matching. To determine whether items are similar, the sparsity control module 318 computes a term frequency for each item's word token(s) relative to a total number of word tokens generated for the items being considered. A term frequency closer to one indicates that the items are similar, while a term frequency value closer to zero indicates that the items are not similar.

Representing the title of the item in the user's known inventory 108 that was used to identify the different category node 308 as x and representing n items 310 included in the different category node 308 as $y_1, y_2, \ldots, y_n$, the sparsity control module 318 predicts the i'-th item in the different category node 308 as the masked value in the evaluation dataset according to Equation 1. In Equation 1, the argmax function returns the maximum output of the similarity function, where the similarity function represents the natural language processing method implemented by the sparsity control module 318.

$$i' = \text{argmax}_i \text{ similarity}(x, y_i) \quad \text{(Eq.1)}$$

Predictions for the masked values in the evaluation dataset made using Equation 1 are denoted as $\hat{M}_{uj}(\delta)$, where $\delta$ represents the edge threshold 320, such that a resulting complexity of the cross-category directional graph 116 generated using the edge threshold 320 is represented as $\Omega(\delta)$. The sparsity control module 318 is configured to select an edge threshold 320 that minimizes the loss function set forth in Equation 2, which achieves minimizing inaccurate predictions (e.g., minimizing an error associated with predicting masked values in the evaluation dataset) and an optimal edge density of the cross-category directional graph 116. In Equation 2, |S| represents the cardinality set of the evaluation dataset.

$$\min_\delta \frac{\sum_{u,j \in S} I(M_{uj}^{(true)} \neq \hat{M}_{uj}(\delta))}{|S|} + \Omega(\delta) \quad \text{(Eq. 2)}$$

The edge generation module 314 then uses the edge threshold 320 computed according to Equation 2 to filter the weighted node connections 316 and generate an edge 322 in the cross-category directional graph 116 for each of the weighted node connections 316 having a corresponding weight that satisfies the edge threshold 320. In this manner, the cross-category directional graph 116 is generated as having an edge 322 connecting a category node pair only if the user data 106 indicates that a threshold number of users have a known inventory 108 that lists items included in both category nodes 308 of the category node pair.

The edge generation module 314 assigns a weight 324 to each edge 322 based on the weight specified by the corresponding one of the weighted node connections 316 used to generate the edge 322. The edge generation module 314 further assigns a direction 326 to each edge 322. The direction 326 for each edge is assigned based on the value 312 for each category node 308 in the node pair connected by the edge 322. In some implementations, the direction 326 of the edge 322 flows from the category node 308 in the node pair having the lower value 312 to the category node 308 in the node pair having the higher value 312. Alternatively, the direction 326 is designated to flow from a higher value to a lower value. For an example illustration of a cross-category directional graph 116, consider FIG. 4.

Figure 4:
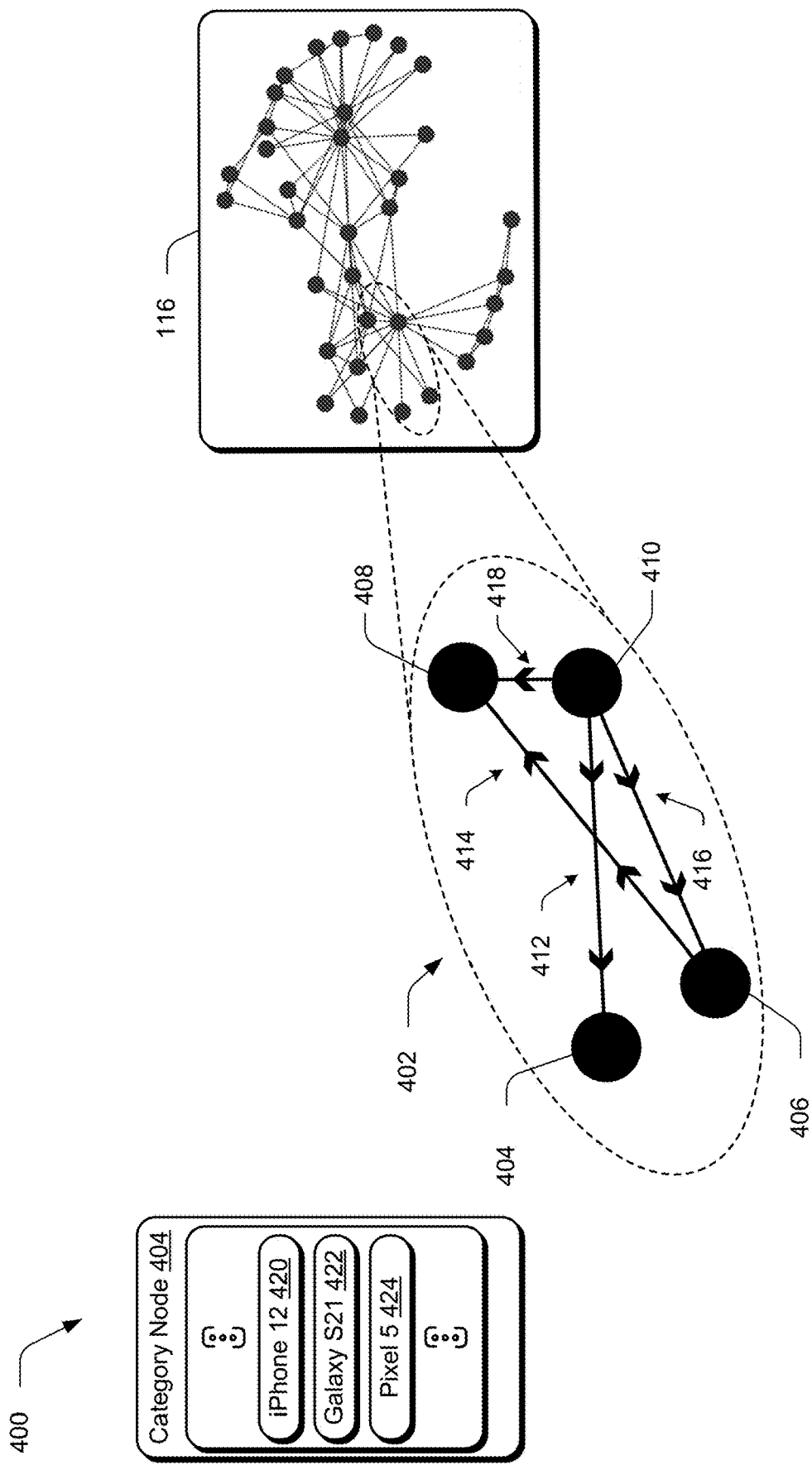
FIG. 4 depicts an example implementation showing a representation of a cross-category directional graph implemented by the inventory prediction system of FIG. 1 in greater detail.

As shown in the example implementation 400 of FIG. 4, a cross-category directional graph 116 includes a plurality of category nodes 308, where various pairs of the category nodes 308 are linked by an edge 322. Detailed view 402 depicts an example of four category nodes 404, 406, 408, and 410 that are connected to one another via one or more edges 412, 414, 416, and 418 in the cross-category directional graph 116.

In the example implementation 400, category node 404 is representative of a category node 308 that includes items 310 classified by the item categorization module 306 as "smartphones." Consequently, category node 404 includes smartphone items in the known inventories of different users, such as an "iPhone 12" item 420, a "Galaxy S21" item 422, a "Pixel 5" item 424, and so forth. Category node 406 is representative of items classified by the item categorization module 306 as "smartphone parts," category node 408 is representative of items classified as "smart watches," and category node 410 is representative of items classified as "smartphone accessories."

Relative values 312 of the category nodes 404, 406, 408, and 410 are indicated by the directions of connecting edges 412, 414, 416, and 418. For instance, edge 412 is depicted as flowing from category node 410 to category node 404, which is indicative of the smartphone items included in category node 404 having higher values relative to the cell phone accessory items included in category node 410. Edge 414 is depicted as flowing from category node 406 to category node 408, indicating that the smartphone parts have lower values than the smart watches, as represented by the respective category nodes. Similarly, edge 416 indicates that items included in category node 406 are generally associated with a value that is greater than the value associated with items in category node 410, and edge 418 indicates that the value associated with items in category node 410 is also less than the value associated with category node 408.

In this manner, the cross-category directional graph 116 provides a representation of common item ownership among known inventories for different users as expressed by the user data 106, categorizes the known inventory items based on type, and relates different item categories based on values associated with their included items. In doing so, the cross-category directional graph 116 structures data describing users' known inventory items in a manner that enables accurate prediction of item ownership not explicitly listed in a user's known inventory while minimizing computational resources required to output the prediction.

Returning to FIG. 2, the graph generation module 202 provides the cross-category directional graph 116 to an item identification module 204. The item identification module 204 is configured to implement a trained prediction model 206 to output a predicted inventory item 114 for a specified user 208, such as one of the plurality of users represented in user data 106. To do so, information describing at least one item known to be owned by the specified user 208 is input to the prediction model 206. In some implementations, the specified user 208 is represented in the user data 106, and the item identification module 204 selects an item known to be owned by the specified user 208 from a corresponding known inventory 108 included in the user data 106. Alternatively or additionally, the item known to be owned by the specified user 208 is gleaned from data separate from the user data 106, such as via user input at the computing device implementing the inventory prediction system 104.

The prediction model 206 is trained to identify one of the category nodes 308 in the cross-category directional graph 116 that includes the item known to be owned by the specified user 208. To do so, the prediction model 206 implements a natural language processing method (e.g., cosine similarity, Euclidean distance, Jaccard similarity, and so forth) to compare information describing the item known to be owned by the specified user 208 (e.g., an item title, item description, and the like) and labels assigned to the category nodes 308 of the cross-category directional graph 116. Upon identifying the category node having a maximum similarity to the item known to be owned by the specified user 208, the prediction model 206 determines whether the category node is associated with any edges 322 having a direction leading away from the category node to a different category node in the cross-category directional graph 116.

Responsive to determining that the identified category node is not associated with an edge leading away from the identified category node to a different category node, the prediction model 206 selects a different item known to be owned by the specified user 208 for use in outputting the predicted inventory item 114. Alternatively, responsive to determining that the identified category node is associated with one or more edges 322 leading away from the identified category node, the prediction model 206 identifies the edge having the greatest weight 324 and traverses the highest-weighted edge to detect a different category node that is connected to the identified category node by the edge. For instance, in the context of the example implementation 400, responsive to determining that the item known to be owned by the specified user 208 corresponds to category node 406, the prediction model 206 identifies edge 414 as the highest weighted edge leading away from category node 406 and traverses edge 414 to detect category node 408.

The prediction model 206 then implements Equation 1 as described above to identify an item in the detected category node that is most similar to the item known to be owned by the specified user 208. With respect to Equation 1, the item of known ownership by the specified user 208 is represented as x and items included in the detected category node (e.g., items included in category node 408 detected in the above example with respect to FIG. 4) are represented as $y_1$, $y_2$, . . . , $y_n$. The prediction model 206 uses Equation 1 to output the predicted inventory item 114 as the i'-th item in the detected category node. As implemented by the prediction model 206, the argmax function returns the maximum output of the similarity function and the similarity function represents a natural language processing method used to evaluate similarity between the $y_1$, $y_2$, . . . , $y_n$ items in the detected category node and the item of known ownership by the specified user 208.

The item identification module 204 outputs the predicted inventory item 114 for display, such as at a display device of a computing device implementing the inventory prediction system 104. In some implementations, the item identification module 204 outputs a display of the predicted inventory item 114 together with a prompt for confirmation regarding an accuracy of the predicted inventory item 114. In response to receiving feedback indicating that the predicted inventory item 114 represents an item owned by the specified user 208, the inventory prediction system 104 is configured to update a database entry in the user data 106 associated with the specified user 208 to add the predicted inventory item 114 to a known inventory of the specified user 208.

The item identification module 204 further provides the predicted inventory item 114 to a listing recommendation module 210. The listing recommendation module 210 is configured to compare the predicted inventory item 114 to trending items 212 included in the trending item list 124 and compute a trending score for the predicted inventory item 114. To compute the trending score for the predicted inventory item 114, the listing recommendation module 210 employs a logistic regression model 216 to compare attributes of the predicted inventory item 114 against attributes 214 of each at least one trending item 212 specified in the trending item list 124. Example attributes 214 include a product description of the trending item 212, seller information for the trending item 212, a category description for the trending item 212, a brand of the trending item 212, a condition of the trending item 212, a rank of the trending item 212 relative to other items in the trending item list 124, an average sale price for the trending item 212, and so forth.

The logistic regression model 216 is configured to consider three criteria as input in generating the trending score for the predicted inventory item 114: item similarity, rank in the trending item list 124, and item value. The listing recommendation module 210 quantifies a similarity between the predicted inventory item 114 and the trending item 212 on a scale of zero to one, where zero indicates no similarity between the predicted inventory item 114 and items included in the trending item list 124 and one indicates that the predicted inventory item 114 is included in the trending item list 124. In determining the similarity between the predicted inventory item 114 and a trending item 212, the listing recommendation module 210 implements a natural language processing model (e.g., a cosine similarity model, Euclidean distance model, Jaccard similarity model, and the like) to identify similarities between attributes 214 of the trending item 212 and corresponding attributes of the predicted inventory item 114.

The input criterion for the logistic regression model 216 representing a rank in the trending item list 124 is normalized on a scale of one to zero by the listing recommendation module 210, with a value of one indicating that the predicted inventory item 114 is the top-trending item on the trending item list 124 and a value of zero indicating that the predicted inventory item 114 indicating that the predicted inventory item 114 is not in the trending item list 124. In some implementations where the predicted inventory item 114 is not in the trending item list 124 but satisfies a threshold level of similarity to one of the trending items included in the trending item list 124, the rank of the similar item in the trending item list 124 is used for the predicted inventory item 114 as the input criterion to the logistic regression model 216.

The input criterion for the logistic regression model 216 representing an item value for the predicted inventory item 114 is representative of an average sale price of the predicted inventory item 114. In implementations where the predicted inventory item 114 corresponds to a trending item 212 listed in the trending item list 124, the listing recommendation module 210 determines the average sale price from attributes 214 of the trending item 212. Alternatively, in implementations where the predicted inventory item 114 is not listed on the trending item list 124, the listing recommendation module 210 determines the average sale price by querying one or more e-commerce marketplaces for listings offering the predicted inventory item 114 for sale.

The logistic regression model 216 then determines whether to generate a listing recommendation 122 for the predicted inventory item 114 according to Equation 3. In Equation 3, $p(y_i)$ represents a probability that a listing recommendation 122 should be generated for the predicted inventory item 114, $y_i$, $w_0$ is the bias term, $w_1$ is the weight for the item similarity criterion $x_{1i}$ (for predicted inventory item i), $w_2$ is the weight for the trending rank criterion $x_{2i}$, and $w_3$ is the weight for the item value criterion $x_{3i}$.

$$p(y_i) = \frac{1}{1 + e^{-(w_0 + w_1 x_{1i} + w_2 x_{2i} + w_3 x_{3i})}} \quad \text{(Eq. 3)}$$

The listing recommendation module 210 trains the logistic regression model 216 using the loss function set forth in Equation 4, where i represents a training data index ranging from 1 to N. Combined with gradient descent, the loss function is used to adjust the bias term and various weights used by the logistic regression model 216 in determining whether to generate a listing recommendation for the predicted inventory item 114. As set forth in Equation 4, $\Theta$ represents ($w_0$, $w_1$, $w_2$, $w_3$) and J represents the loss function.

$$J(\Theta) = -\frac{1}{N} \sum_{i=1}^{N} y_i \cdot \log(p(y_i)) + (1 - y_i) \cdot \log(1 - p(y_i)) \quad \text{(Eq. 4)}$$

Responsive to determining that the probability that a listing recommendation should be generated for the predicted inventory item 114 satisfies a probability threshold, the listing recommendation module 210 generates the listing recommendation 122. In some implementations, the probability threshold is set to 0.5. Alternatively, the probability threshold is set to z, where $0 < z \leq 1$.

In some implementations where predictions are simultaneously generated for multiple predicted inventory items 114, the probability threshold is determined based on a display capability of a computing device implementing the inventory prediction system 104. For instance, if the computing device is limited in its available rendering area for displaying only three listing recommendations, the probability threshold is set to exclude all but the highest three probabilities computed for various predicted inventory items 114, such that listing recommendations 122 are generated for only the top three predicted inventory items, as ranked by their associated probabilities computed according to Equation 4. The listing recommendation 122 is generated to include a description of the predicted inventory item 114 in the form of an image, a textual description, or combinations thereof. The listing recommendation 122 is further generated to include an estimated value 126 for the predicted inventory item 114. In implementations, the estimated value 126 is determined by the listing recommendation module 210 from information included in the trending item list 124. Alternatively or additionally, the estimated value 126 for the is ascertained by comparing attributes of the predicted inventory item 114 (e.g., title, category, brand, condition, description, and so forth) to information describing at least one similar items for sale via one or more retail entities (e.g., gross merchandise value, number of unique buyers, available quantity for sale, quantities purchased on the at least one similar item, average sale price, and the like).

By providing the estimated value 126 for the predicted inventory item 114, the listing recommendation 122 informs a user of the inventory prediction system 104 as to a current market demand or valuation for items that are owned by the user, but not identified as being owned in information describing a known inventory of the user. In some implementations, the listing recommendation 122 is populated with options that are selectable via input to specify a user intent relative to the predicted inventory item 114.

For instance, the listing recommendation 122 includes an option 218 that is selectable to indicate a user's intent to keep the predicted inventory item 114. Responsive to detecting input at option 218, the inventory prediction system 104 is configured to update a database record entry in the user data 106 to add the predicted inventory item 114 to a known inventory associated with the specified user 208.

Alternatively or additionally, the listing recommendation 122 includes an option 220 that is selectable to indicate a user's intent to list the predicted inventory item 114 for sale. Responsive to detecting input at option 220, the inventory prediction system 104 causes display of a user interface (e.g., via display device 120) for a retail entity that is useable to generate a listing for the predicted inventory item 114. In some implementations, as part of causing display of the listing generation interface for the retail entity, the inventory prediction system 104 transmits information describing the predicted inventory item 114 to the retail entity for automatic generation of a listing for sale.

The inventory prediction system 104 is configured to repeat the above-described operations to output at least one additional predicted inventory item 114 for the specified user 208. In some implementations, the inventory prediction system 104 uses the predicted inventory item 114 as input to the prediction model 206 for use in outputting an additional predicted inventory item 114 for the specified user 208.

Alternatively or additionally, the inventory prediction system 104 selects another item from a known inventory of the specified user 208 to output an additional predicted inventory item 114, and is configured to output a plurality of predicted inventory items as necessary until a known inventory for the specified user 208 is complete as to items actually owned by the specified user 208. From the plurality of predicted inventory items, the listing recommendation module 210 processes the items using the logistic regression model 216 and generates a listing recommendation 122 for each predicted inventory item associated with an output probability that satisfies the probability threshold for the logistic regression model 216.

Figure 5:
FIG. 5 depicts examples of listing recommendations for predicted inventory items generated by the inventory prediction system of FIG. 1 in greater detail.

As shown in the example implementation 500 of FIG. 5, the inventory prediction system 104 is configured to output a display of multiple listing recommendations for predicted inventory items identified by the listing recommendation module 210 as satisfying a threshold probability for the logistic regression model 216.

As depicted in the example implementation 500, the inventory prediction system 104 generates three different listing recommendations 502, 504, and 506, for corresponding predicted inventory items 114 output for the specified user 208. In implementations, different listing recommendations as represented by listing recommendation 502, listing recommendation 504, and listing recommendation 506 are simultaneously output in the user interface 118 by the inventory prediction system 104. In some implementations, the user interface 118 is periodically updated as the inventory prediction system 104 outputs new predicted inventory items 114 for a specified user 208, such that the user interface 118 is updated in real-time to display items predicted to be owned by the specified user 208 that satisfy the corresponding prediction threshold of the logistic regression model 216.

In some implementations, the listing recommendations output in the user interface 118 are ordered based on the probability output by the logistic regression model 216 indicating that the listing recommendation should be generated for its corresponding predicted inventory item. For instance, in the example implementation 500, listing recommendation 502 identifies a smartphone, listing recommendation 504 identifies a child's toy, and listing recommendation 506 identifies a watch, which are each representative of a predicted inventory item 114 output for the specified user 208 that are identified as trending by the listing recommendation module 210.

In the illustrated example, the relative positioning of the listing recommendations from left to right is indicative of the smartphone of listing recommendation 502 having the highest probability relative to all predicted inventory items 114 considered by the logistic regression model 216, with the child's toy having a second-highest probability, the watch having a third-highest probability, and so forth. The inventory prediction system 104 is configured to present any suitable number of listing recommendations 122 in any suitable order and/or positioning in the user interface 118, and is not constrained by the depicted user interface of implementation 500. The user interface 118 is configured to be output for display in a range of manners, such as in a native user interface for an application, as part of a web page, as part of an electronic message, as part of a notification, combinations thereof, and so forth.

Having considered example systems and techniques for generating a cross-category directional graph, outputting predicted inventory items using the cross-category directional graph, and generating listing recommendations for the predicted inventory items, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5.

Figure 6:
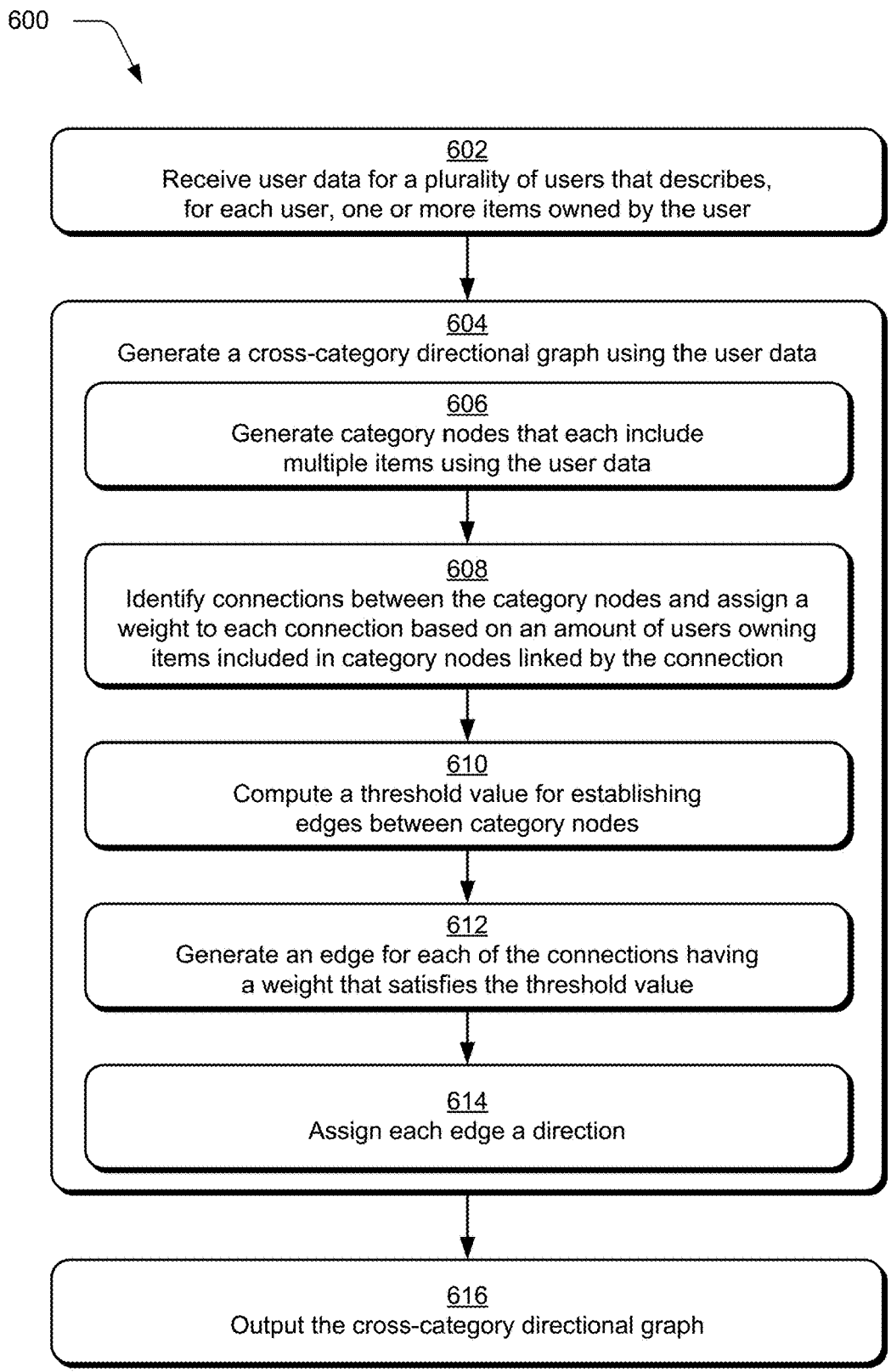
FIG. 6 is a flow diagram depicting a procedure in an example implementation in which a cross-category directional graph is generated from user data describing item ownership.

FIG. 6 depicts a procedure 600 in an example implementation of generating a cross-category directional graph in accordance with the techniques described herein. In accordance with one or more implementations, procedure 600 is performed by the inventory prediction system 104 to generate the cross-category directional graph 116. To do so, user data is received for a plurality of users, where the user data describes one or more items owned by each user in the plurality of users (block 602). The data aggregation module 302 implemented by the graph generation module 202, for instance, receives user data 106. In some implementations, the user data 106 is received from a storage device 110 of the computing device 102 implementing the inventory prediction system 104. Alternatively or additionally, the user data 106 is received from one or more sources implemented remotely from the computing device 102, such as via network 112.

A cross-category directional graph is then generated using the user data (block 604). As part of generating the cross-category directional graph 116, the graph generation module 202 generates category nodes that each include multiple items described in the user data (block 606). The data aggregation module 302, for instance, parses the user data 106 to determine a known inventory 108 of one or more items owned by each user 304 listed in the user data 106. The data aggregation module 302 then communicates the known inventory 108 data to the item categorization module 306, which assigns individual items from the known inventories to category nodes 308 based on attributes describing the individual items, and computes a value 312 for each category node based on the respective values of items 310 included in the category node.

Connections are then identified between the category nodes, and weights are assigned to each connection based on a number of users owning items included in both category nodes linked by the connection (block 608). The edge generation module 314, for instance, computes weighted node connections 316 between various pairs of category nodes responsive to identifying that known inventories of at least two different users include items listed in both nodes of a category node pair. The weight assigned to an individual weighted node connection is representative of an amount of the users whose known inventories include items listed in both of the category nodes linked by the node connection.

A threshold value is then computed for establishing edges between category nodes to include in the cross-category directional graph (block 610). The sparsity control module 318, for instance, computes edge threshold 320 by generating an evaluation dataset that masks certain items listed in the user data 106. The sparsity control module 318 attempts to predict the known inventory 108 values that are masked in the evaluation dataset by evaluating item title similarities using natural language processing and determines a value for the threshold 320 according to Equations 1 and 2.

An edge is then generated for each of the connections having a weight that satisfies the threshold value (block 612). The edge generation module 314, for instance, filters the weighted node connections 316 by generating an edge 322 for only those weighted node connections 316 having a corresponding weight that satisfies the edge threshold 320. Each edge is finally assigned a direction (block 614). The edge generation module 314, for instance, assigns a direction 326 for each edge 322 based on the value 312 associated with each category node 308 in the node pair connected by the edge 322. For example, the direction 326 of the edge 322 is assigned as pointing from the category node 308 in the node pair having the lower value 312 to the category node 308 in the node pair having the higher value 312.

The cross-category directional graph 116 is then output (block 616). The graph generation module 202, for instance, outputs the cross-category directional graph 116 as including the plurality of category nodes 308 generated by the item categorization module 306 as being linked by the edges 322 created by the edge generation module 314. In some implementations, the cross-category directional graph 116 is output to the storage device 110 of the computing device implementing the inventory prediction system 104. Alternatively or additionally, the cross-category directional graph 116 is output to a different computing device, storage location, or the like.

Figure 7:
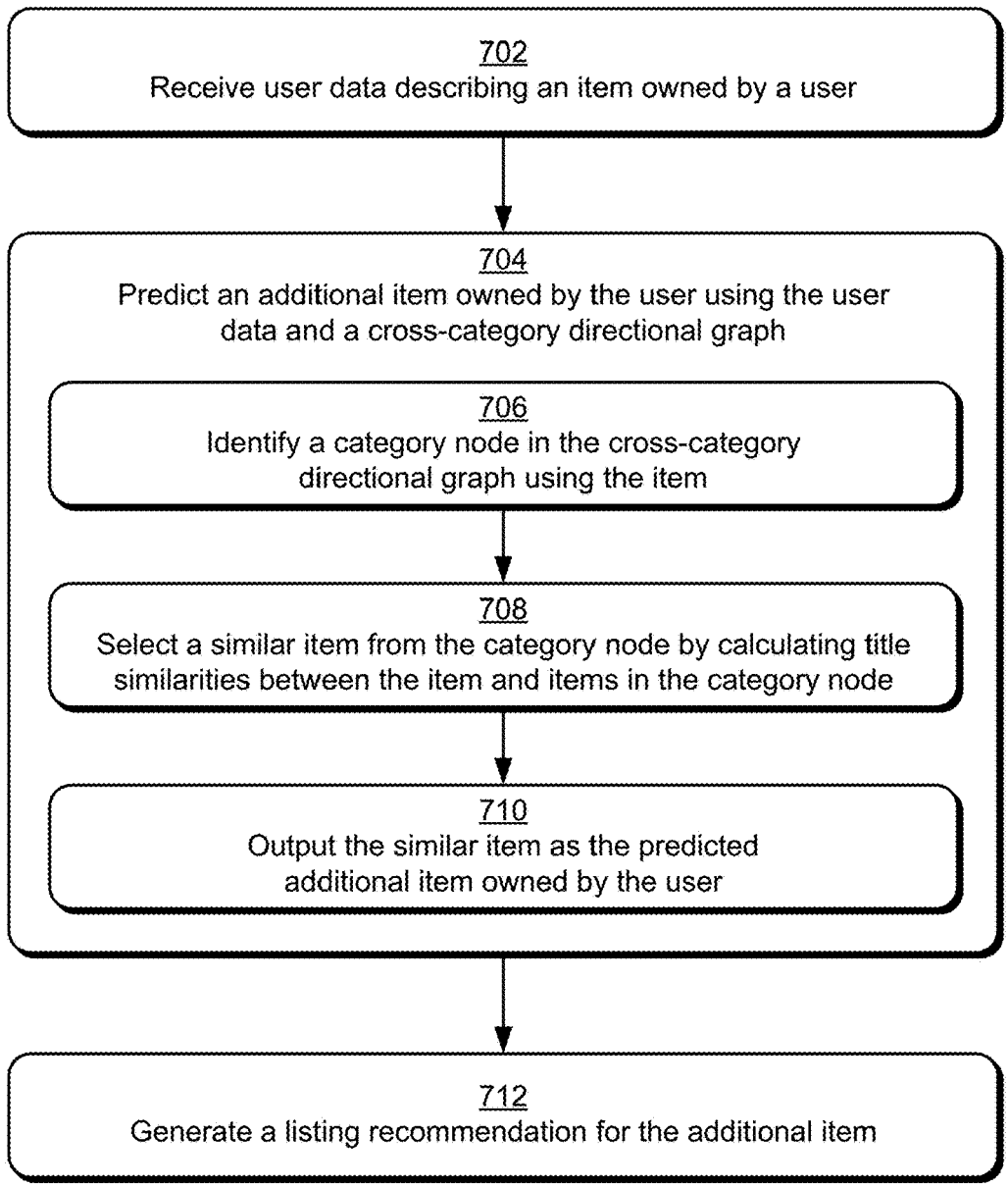
FIG. 7 is a flow diagram depicting a procedure in an example implementation in which an inventory item is predicted using a cross-category directional graph and a listing recommendation is generated for the predicted inventory item.

FIG. 7 depicts a procedure 700 in an example implementation of predicting an inventory item owned by a user via the cross-category directional graph and generating a listing recommendation for the predicted inventory item in accordance with the techniques described herein. To begin, user data is received describing an item owned by a user (block 702). The item identification module 204 of the inventory prediction system 104, for instance, receives an indication of a specified user 208 for whom the predicted inventory item 114 is to be output. The item identification module 204 compares an identity of the specified user 208 against the user data 106 to identify one or more items included in a known inventory 108 associated with the specified user 208.

An additional item owned by the user is then predicted using the user data and a cross-category directional graph (block 704). For instance, the item identification module 204 receives the cross-category directional graph 116 from the graph generation module 202 and processes the at least one item identified from the known inventory 108 of the specified user 208 using the prediction model 206.

Given the at least one item and the cross-category directional graph 116 as input, the prediction model 206 is configured to identify a category node in the cross-category directional graph (block 706). To do so, the prediction model 206 first selects a category node that includes, or includes items similar to, the item known to be owned by the specified user 208 in the cross-category directional graph 116. If the selected category node is associated with one or more edges 322 leading away from the identified category node, the prediction model 206 identifies the edge having the greatest weight 324 and traverses the highest-weighted edge to detect a different category node that is connected to the selected category node.

For instance, in the context of the example implementation 400, responsive to determining that the item known to be owned by the specified user 208 is included in category node 410, the prediction model 206 compares the respective weights of edges 412, 416, and 418 leading away from category node 410 to identify the edge having the greatest weight. Responsive to determining that edge 412 has the greatest weight of the edges leading away from the selected category node 410, the prediction model 206 traverses edge 412 to identify category node 404.

A similar item is then selected from the category node by calculating title similarities between the item known to be owned by the user and items in the identified category node (block 708). Continuing the example described with respect to the illustrated implementation 400, the prediction model 206 implements Equation 1 to identify an item in category node 404 that is most similar to the item known to be owned by the specified user 208 (e.g., item 420, item 422, or item 424), and designates the similar item as the predicted inventory item 114.

The similar item is the output as the predicted additional item owned by the user (block 710). For instance, the item identification module 204 outputs the predicted inventory item 114 for display, such as at a display device of a computing device implementing the inventory prediction system 104. In some implementations, the predicted inventory item 114 is output together with descriptive information, such as an item title, an item description, an estimated value, and so forth.

A listing recommendation is then generated for the additional item (block 712). The item identification module 204, for instance, provides the predicted inventory item 114 to the listing recommendation module 210 of the inventory prediction system 104. The listing recommendation module 210 compares the predicted inventory item 114 to trending items 212 included in the trending item list 124 and computes a trending score for the predicted inventory item 114 using logistic regression model 216.

The logistic regression model 216 is configured to consider three criteria as input in generating the trending score for the predicted inventory item 114: item similarity, rank in the trending item list 124, and item value. The logistic regression model 216 then determines whether to generate a listing recommendation for the predicted inventory item 114 according to Equation 3. Responsive to determining that the probability that a listing recommendation should be generated for the predicted inventory item 114 satisfies a probability threshold, the listing recommendation module 210 generates the listing recommendation 122.

The listing recommendation 122 is generated to include a description of the predicted inventory item 114 in the form of an image, a textual description, or combinations thereof.

The listing recommendation 122 is further generated to include an estimated value 126 for the predicted inventory item 114. In implementations, the estimated value 126 is determined by the listing recommendation module 210 from information included in the trending item list 124.

The listing recommendation 122 is generated to include an option 220 that is selectable to indicate the specified user's 208 intent to list the predicted inventory item 114 for sale. Responsive to detecting input at option 220, the inventory prediction system 104 causes display of a user interface (e.g., via display device 120) for a retail entity that is useable to generate a listing for the predicted inventory item 114. In some implementations, as part of causing display of the listing generation interface for the retail entity, the inventory prediction system 104 transmits information describing the predicted inventory item 114 to the retail entity for automatic generation of a listing for sale.

Having described example procedures in accordance with one or more implementations, consider now an example system and device to implement the various techniques described herein.

Example System and Device

Figure 8:
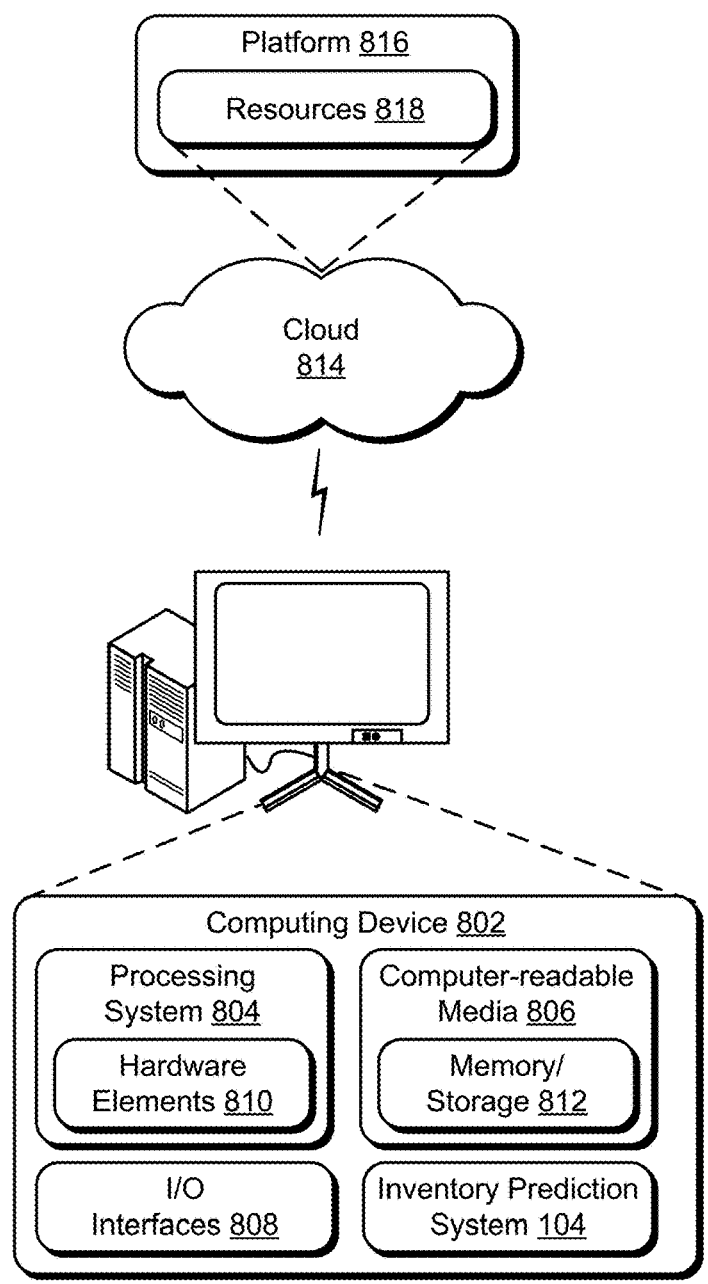
FIG. 8 illustrates an example system including various components of an example device to implement the techniques described with reference to FIGS. 1-7.

FIG. 8 illustrates an example system 800 that includes an example computing device 802, which is representative of one or more computing systems and/or devices that implement the various techniques described herein. This is illustrated through inclusion of the inventory prediction system 104. The computing device 802 is configured, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that are configurable as processors, functional blocks, and so forth. For instance, hardware element 810 is implemented in hardware as an application specific integrated circuit or other logic device formed using one or more semiconductors. The hardware elements 810 are not limited by the materials from which they are formed or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 806 is illustrated as including memory/storage 812. The memory/storage 812 represents memory/storage capacity associated with one or more computer-readable media. The memory/storage 812 is representative of volatile media (such as random access memory (RAM)) and/or nonvolatile media (such as read only memory (ROM), Flash memory, optical disks, magnetic disks, and so forth). The memory/storage 812 is configured to include fixed media (e.g., RAM, ROM, a fixed hard drive, and so on) as well as removable media (e.g., Flash memory, a removable hard drive, an optical disc, and so forth). In certain implementations, the computer-readable media 806 is configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 810. The computing device 802 is configured to implement instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is further configured to be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that is utilized while computer processing is executed on servers that are remote from the computing device 802. Resources 818 also include services provided over the Internet and/or through a subscriber network, such as a cellular or Wi-Fi network.

The platform 816 is configured to abstract resources and functions to connect the computing device 802 with other computing devices. The platform 816 is further configured to abstract scaling of resources to provide a corresponding level of scale to encountered demand for the resources 818 that are implemented via the platform 816. Accordingly, in an interconnected device embodiment, implementation of functionality described herein is configured for distribution throughout the system 800. For example, in some configurations the functionality is implemented in part on the computing device 802 as well as via the platform 816 that abstracts the functionality of the cloud 814.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving data describing at least one item owned by a user;
   predicting an additional item owned by the user by implementing a prediction model trained using machine learning to:
      determine a first item category that includes the at least one item;
      identify a second item category that is related to the first item category and includes the additional item; and
      ascertain a description of the at least one item and select the additional item from the second item category based on the description;
   outputting a display of the additional item at a client device associated with the user, the display of the additional item including a prompt for feedback from the user regarding ownership of the additional item;
   receiving input confirming the ownership of the additional item via the prompt and updating a database record associated with the user to include the additional item in the data describing the at least one item owned by the user responsive to the input confirming the ownership of the additional item;
   determining, based on a probability value associated with a logistic regression model, that the additional item is currently trending;
   outputting, in real-time and responsive to determining that the additional item is currently trending, a display of a plurality of listing recommendations comprising a listing recommendation for the additional item, the listing recommendation for the additional item including an estimated value for the additional item together with a control that is selectable to generate a listing for sale of the additional item, wherein an order of the listing recommendation in the plurality of listing recommendations is based on the probability value; and
   generating the listing for sale of the additional item responsive to receiving input at the control that indicates a selection to generate the listing for sale of the additional item.

2. The method of claim 1, further comprising:
   generating a cross-category directional graph comprising a plurality of nodes, wherein each of the plurality of nodes represents an item category including multiple items;
   generating a plurality of edges that each connect two of the plurality of nodes, wherein each of the plurality of edges is generated responsive to determining that items included in two of the plurality of nodes connected by a respective edge are owned by at least two different users; and outputting the cross-category directional graph, wherein the prediction model is trained to identify the second item category using the cross-category directional graph.

3. The method of claim 2, wherein the prediction model is configured to identify the second item category that is related to the first item category by detecting that an edge of the plurality of edges in the cross-category directional graph:
   links one of the plurality of nodes representing the first item category and one of the plurality of nodes representing the second item category; and
   has a direction pointing from the first item category to the second item category.

4. The method of claim 3, wherein the prediction model is further configured to:
   ascertain that one of the plurality of nodes representing the first item category is associated with at least two edges of the plurality of edges having a direction pointing away from the first item category;
   determine a weight associated with each of the at least two edges of the plurality of edges; and
   select the edge of the plurality of edges responsive to identifying that the edge of the plurality of edges has a greater weight relative to others of the at least two edges of the plurality of edges.

5. The method of claim 1, wherein the prediction model is trained to select the additional item by using natural language processing to generate similarity scores that each indicate a degree of similarity between the at least one item and an item included in the second item category.

6. The method of claim 1, further comprising:
   responsive to determining that the additional item is currently trending, calculating the estimated value for the additional item.

7. The method of claim 1, wherein determining that the additional item is currently trending comprises:
   causing the logistic regression model to generate the probability value, wherein the probability value indicates that the listing recommendation should be generated by comparing the additional item to attributes describing one or more items included in a trending item list; and
   determining that the additional item is trending responsive to identifying that the probability value satisfies a trending threshold probability value.

8. The method of claim 7, wherein the logistic regression model is configured to generate the probability value based on a similarity of the additional item to the one or more items included in the trending item list, a rank of the additional item relative to the trending item list, and the estimated value of the additional item.

9. A system comprising:
   at least one processor; and
   a computer-readable storage medium storing instructions that are executable by the at least one processor to perform operations comprising:
      receiving user data describing, for each of a plurality of users, a respective known inventory of a plurality of known inventories corresponding to the plurality of users specifying at least one item owned by a respective user;
      generating a cross-category directional graph from the user data, the cross-category directional graph comprising a plurality of category nodes that each represent multiple items specified in the plurality of known inventories of the user data and a plurality of edges that each link two category nodes of the plurality of category nodes and indicate ownership of items included in both of the two linked category nodes by at least two different users;
      predicting, by implementing a prediction model trained using machine learning to identify a first category node of the plurality of category nodes in the cross-category directional graph that includes the at least one item owned by a user of the plurality of users, an additional item owned by the user that is not included in the respective known inventory for the user;
      outputting, in real-time, a display of a plurality of listing recommendations comprising a listing recommendation for the additional item in a user interface, the listing recommendation for the additional item including a control that is selectable to generate a listing for sale of the additional item; and
      generating the listing for sale of the additional item responsive to receiving input at the control that indicates a selection to generate the listing for sale of the additional item.

10. The system of claim 9, the operations further comprising generating an estimated value for the additional item and outputting a display of the estimated value in the user interface.

11. The system of claim 9, wherein generating the cross-category directional graph comprises assigning a value to respective category nodes of the plurality of category nodes, the value being based on values of the multiple items represented by the respective category nodes.

12. The system of claim 11, wherein generating the cross-category directional graph comprises assigning a direction to each of the plurality of edges, wherein the direction is assigned to an edge based on values of two of the plurality of category nodes that are linked by the edge.

13. The system of claim 9, wherein generating the cross-category directional graph comprises:
   generating a plurality of category node connections using the user data, each of the plurality of category node connections linking two category nodes of the plurality of category nodes and indicating that known inventories for at least two different users in the user data include items in the two category nodes of the plurality of category nodes;
   assigning a weight to each category node connection of the plurality of category node connections based on a number of users in the user data with respective known inventories that include items in the two category nodes of the plurality of category nodes;
   determining an edge threshold for filtering the plurality of category node connections; and
   generating a respective edge of the plurality of edges for each of the plurality of category node connections having an assigned weight that satisfies the edge threshold, wherein the prediction model traverses the cross-category directional graph to identify a second category node of the plurality of category nodes based on the assigned weight, the second category node representing the additional item.

14. The system of claim 13, wherein determining the edge threshold comprises:
   generating an evaluation dataset from the user data by masking a subset of items described in the known inventories for the plurality of users;

predicting identifiers for each of the masked subset of items using unmasked information in the evaluation dataset and identifying an edge density in the evaluation dataset that minimizes an error associated with predicting the identifiers; and selecting the edge threshold based on the identified edge density.

15. A method implemented by a computing device, the method comprising:

receiving data describing a known inventory for an entity that specifies at least one item owned by the entity;

predicting an additional item owned by the entity that is not included in the known inventory using a graph that represents item categories as nodes and links the nodes with edges representing ownership of items in linked item categories by multiple different entities;

determining, based on a probability value associated with a logistic regression model, that the additional item is currently trending;

generating, responsive to determining that the additional item is currently trending, a listing recommendation that includes an estimated value for the additional item and a description of the additional item;

outputting, in real-time, a display of a plurality of listing recommendations comprising the listing recommendation at a client device, the display of the listing recommendation including a prompt for feedback from the entity regarding ownership of the additional item and the listing recommendation including a control that is selectable to generate a listing for sale of the additional item;

receiving input confirming the ownership of the additional item via the prompt and updating a database record associated with the entity to include the additional item in the data describing the at least one item owned by the entity responsive to the input confirming the ownership of the additional item; and generating the listing for sale of the additional item responsive to receiving input at the control that indicates a selection to generate the listing for sale of the additional item.

16. The method of claim 15, wherein generating the listing recommendation is performed responsive to determining that the additional item is currently trending by comparing the additional item to attributes describing one or more items included in a trending item list.

17. The method of claim 15, wherein generating the listing recommendation is performed responsive to determining that the additional item is trending based on a similarity of the additional item to one or more items included in a trending item list, a rank of the additional item relative to the trending item list, and the estimated value for the additional item.

18. The method of claim 15, further comprising transmitting information describing the additional item and the estimated value for the additional item to a retail entity responsive to receiving input at the control to generate the listing for sale.

19. The method of claim 15, wherein the listing recommendation includes a selectable option to keep the additional item.

20. The method of claim 15, further comprising generating the graph by:

generating a plurality of node connections, respective node connections of the plurality of node connections linking two of the nodes and indicating that known inventories for at least two different entities associated with items in the two of the nodes linked by the respective node connections;

assigning a weight to the respective node connections based on a number of entities with known inventories that include items in the two of the nodes linked by the respective node connections;

determining an edge threshold for filtering the plurality of node connections; and generating, for the respective node connections having an assigned weight that satisfies the edge threshold, one of the edges in the graph.

* * * * *